(12) United States Patent
Betley et al.

(10) Patent No.: US 9,734,408 B2
(45) Date of Patent: Aug. 15, 2017

(54) IDENTIFYING STORIES IN MEDIA CONTENT

(71) Applicant: Longsand Limited, Cambridge (GB)

(72) Inventors: Abigail Betley, Cambridge (GB); Unai Ayo Aresti, Cambridge (GB); David Toone, Cambridge (GB)

(73) Assignee: LONGSAND LIMITED, Cambridge (GB)

( * ) Notice: Subject to any disclaimer, the term of this patent is extended or adjusted under 35 U.S.C. 154(b) by 0 days.

(21) Appl. No.: 14/905,487

(22) PCT Filed: Jul. 18, 2013

(86) PCT No.: PCT/EP2013/065232
§ 371 (c)(1),
(2) Date: Jan. 15, 2016

(87) PCT Pub. No.: WO2015/007321
PCT Pub. Date: Jan. 22, 2015

(65) Prior Publication Data
US 2016/0155001 A1  Jun. 2, 2016

(51) Int. Cl.
*H04N 21/234* (2011.01)
*H04N 21/845* (2011.01)
(Continued)

(52) U.S. Cl.
CPC ... *G06K 9/00751* (2013.01); *G06F 17/30837* (2013.01); *G06F 17/30858* (2013.01);
(Continued)

(58) Field of Classification Search
CPC ............ G06K 9/00751; G06K 9/00758; G06F 17/30837; G06F 17/30858; G11B 27/031;
(Continued)

(56) References Cited

U.S. PATENT DOCUMENTS 6,295,092 B1 * 9/2001 Hullinger ............. H04N 21/812
  348/461
6,580,437 B1 * 6/2003 Liou ................... G06F 17/3028
  707/E17.012

(Continued)

OTHER PUBLICATIONS

Lienhart R et al: "Scene determination based on video and audio features", Multimedia Computing and Systems, 1999. IEEE International Conference on Florence, Italy Jun. 7-11, 1999, Los Alamitos, CA, USA, IEEE Comput. Soc, US, vol. 1, Jun. 7, 1999 (Jun. 7, 1999), pp. 685-690, XP010342829.

(Continued)

*Primary Examiner* — Randy Flynn
(74) *Attorney, Agent, or Firm* — Mannava & Kang, P.C.

(57) ABSTRACT

Techniques associated with identifying stories in media content are described in various implementations. In one example implementation, a method may include receiving media content, and segmenting the media content into a plurality of media segments based on auditory indicators included in the media content. The method may also include analyzing a first media segment to determine a first set of concepts associated with the first media segment, and analyzing a second media segment to determine a second set of concepts associated with the second media segment. The method may further include comparing the first set of concepts to the second set of concepts to determine a conceptual similarity between the first set of concepts and the second set of concepts, and in response to the conceptual similarity exceeding a similarity threshold, identifying a story that includes the first media segment and the second media segment.

15 Claims, 4 Drawing Sheets

(51) Int. Cl.
| | |
|---|---|
| H04N 21/8541 | (2011.01) |
| H04N 21/8549 | (2011.01) |
| G06K 9/00 | (2006.01) |
| G06F 17/30 | (2006.01) |
| G11B 27/031 | (2006.01) |
| G11B 27/10 | (2006.01) |
| G11B 27/28 | (2006.01) |

(52) U.S. Cl.
CPC ........ *G06K 9/00758* (2013.01); *G11B 27/031* (2013.01); *G11B 27/10* (2013.01); *G11B 27/28* (2013.01); *H04N 21/23418* (2013.01); *H04N 21/23424* (2013.01); *H04N 21/8456* (2013.01); *H04N 21/8541* (2013.01); *H04N 21/8549* (2013.01); *G06K 2009/00738* (2013.01)

(58) Field of Classification Search
CPC .. G11B 27/10; G11B 27/28; H04N 21/23418; H04N 21/23424; H04N 21/8456; H04N 21/8541; H04N 21/8549
See application file for complete search history.

(56) References Cited

U.S. PATENT DOCUMENTS

| | | | |
|---|---|---|---|
| 6,697,821 | B2 | 2/2004 | Ziff et al. |
| 6,744,922 | B1* | 6/2004 | Walker ............... H04N 21/4394 375/E7.271 |
| 2002/0108115 | A1 | 8/2002 | Palmer |
| 2003/0131362 | A1* | 7/2003 | Jasinschi ........... G06F 17/30787 725/134 |
| 2003/0218696 | A1* | 11/2003 | Bagga ................ H04N 21/4143 348/700 |
| 2006/0092327 | A1 | 5/2006 | Hoashi et al. |
| 2007/0201558 | A1 | 8/2007 | Xu |
| 2007/0245379 | A1* | 10/2007 | Agnihortri ....... H04N 21/26603 725/46 |
| 2008/0193101 | A1* | 8/2008 | Agnihotri .............. G11B 27/28 386/290 |
| 2008/0316307 | A1 | 12/2008 | Petersohn |
| 2009/0007202 | A1* | 1/2009 | Williams ......... H04N 21/23418 725/105 |
| 2009/0175538 | A1* | 7/2009 | Bronstein ........ H04N 21/44008 382/173 |
| 2010/0005485 | A1 | 1/2010 | Tian et al. |
| 2011/0211812 | A1* | 9/2011 | Tzoukermann .... H04N 21/4334 386/250 |
| 2012/0254188 | A1 | 10/2012 | Koperski et al. |
| 2012/0281969 | A1* | 11/2012 | Jiang ..................... G11B 27/11 386/278 |
| 2015/0082349 | A1* | 3/2015 | Ishtiaq ............. H04N 21/23418 725/40 |

OTHER PUBLICATIONS

PCT; "Notification of Transmittal of the International Search Report and the Written Opinion of the International Searching Authority, or the Declaration"; cited in PCT/EP2013/065232; mailed Mar. 12, 2014; 12 pages.

Saraceno C et al: "Identification of story units in audio-visual sequences by joint audio and video processing", Image Processing, 1998. ICIP 98. Proceedings. 1998 International Conference on Chicago, IL, USA Oct. 4-7, 1993, Los Alamitos, CA, SA, IEEE Comput. Soc, US, vol. 1, Oct. 4, 1998 (Oct. 4, 1998), pp. 363-367, XP010308744.

Wong, L.; "ANSES Automatic News Summarization and Extraction"; Nov. 8, 2004; 85 pages.

Yao Wang et al: Multimedia Content Analysis—Using Both Audio and Visual Clues. IEEE Signal Processing Magazine, IEEE Service Center, Piscataway, NJ, US, vol. 17, No. 6, Nov. 200 (Nov. 2000), pp. 12-36, XP011089877.

* cited by examiner

IDENTIFYING STORIES IN MEDIA CONTENT

BACKGROUND

In today's always-connected society, media content in the form of live, pre-recorded, or on-demand programming is nearly ubiquitous. For example, 24×7 news programs offer a continuous stream of live information throughout the day, and countless pre-recorded media sources are accessible, e.g., via the Internet, at any given time.

Media content may be broadcast, streamed, or otherwise delivered via any of a number of communication channels, using a number of different technologies. For example, delivery of streaming video media on the Internet generally includes encoding the video content into one or more streaming video formats, and efficiently delivering the encoded video content to end users.

DETAILED DESCRIPTION

The vast amount of available media content may easily lead to information overload, especially if the media content is not well organized or otherwise structured in a manner that allows users to easily identify specific content that is of interest. As a result, certain content providers, content aggregators, or end users may manually tag or otherwise classify the media content, e.g., by associating metadata with the content. Such manual classification, while fairly accurate, may be relatively inefficient, expensive, and/or time-consuming.

Described herein are techniques for identifying stories in media content, even if the stories have not been previously classified as such. As used herein, the term "story" generally refers to a portion of media content that relates to a particular topic or to a set of consistent concepts. For example, during the course of a nightly news program, one story may describe the outcome of a recent criminal trial, while another story may discuss the success of a local business, and yet another story may relate to the weather. According to the techniques described here, the media content (e.g., the news program) is separated into conceptual stories (e.g., three conceptually distinct stories including the legal story, the business story, and the weather story). Once the stories have been identified using the described techniques, additional useful processing may be performed—e.g., to summarize or classify the stories, or to isolate (e.g., clip) stories from the media content for more convenient access or delivery. These or other appropriate processing techniques may be applied to stories, after they have been identified, to generally make the stories more accessible and/or consumable by end users.

Figure 1:
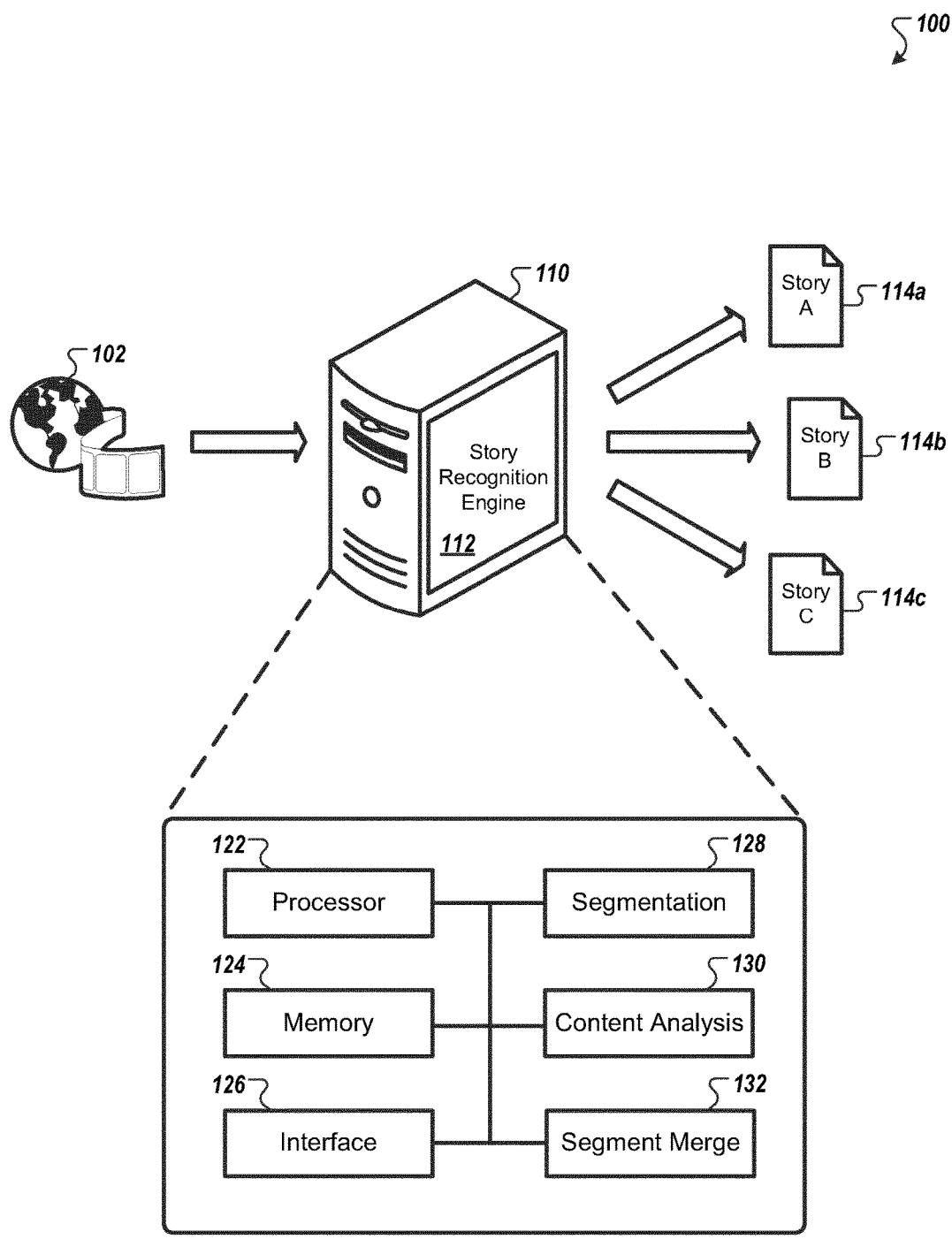
FIG. 1 is a conceptual diagram of an example story recognition environment in accordance with implementations described herein.

FIG. 1 is a conceptual diagram of an example story recognition environment 100 in accordance with implementations described herein. As shown, environment 100 includes a computing system 110 that is configured to execute a story recognition engine 112. The story recognition engine 112 may generally operate to analyze incoming media content 102, and to identify various stories 114a, 114b, and 114c included in the media content 102. As described in further detail below, the story recognition engine 112 may generally identify stories by dividing the media content 102 into segments, analyzing the segments to determine concepts associated with the respective segments, comparing concepts across different segments to determine conceptual similarity of the different segments, and merging segments that are conceptually similar into stories.

The example topology of environment 100 may be representative of various story recognition environments. However, it should be understood that the example topology of environment 100 is shown for illustrative purposes only, and that various modifications may be made to the configuration. For example, environment 100 may include different or additional components, or the components may be implemented in a different manner than is shown. Also, while computing system 110 is generally illustrated as a standalone server, it should be understood that computing system 110 may, in practice, be any appropriate type of computing device, such as a server, a mainframe, a laptop, a desktop, a workstation, or other device. Computing system 110 may also represent a group of computing devices, such as a server farm, a server cluster, or other group of computing devices operating individually or together to perform the functionality described herein.

Media content 102 may be in the form of any appropriate media type, and may be provided from any appropriate media source. Examples of media types that may be processed as described herein include, but are not limited to, audio information (e.g., radio broadcasts, telephone conversations, streaming audio, etc.), video information (e.g., television broadcasts, webcasts, streaming video, etc.), and/or or multimedia information (e.g., combinations of audio, video, graphics, and/or other appropriate content). Examples of media sources include, but are not limited to, broadcast media sources, streaming media sources, online media repositories, standalone physical media (e.g., Blu-Ray discs, DVDs, compact discs, etc.), or the like.

Computing system 110 may include a processor 122, a memory 124, an interface 126, a segmentation module 128, a content analysis module 130, and a segment merge module 132. It should be understood that the components shown are for illustrative purposes only, and that in some cases, the functionality being described with respect to a particular module or component of computing system 110 may be performed by one or more different or additional modules or components, e.g., of computing system 110 or of another appropriate computing system. Similarly, it should be understood that portions or all of the functionality may be combined into fewer modules or components than are shown.

Processor 122 may be configured to process instructions for execution by computing system 110. The instructions may be stored on a non-transitory, tangible computer-readable storage medium, such as in memory 124 or on a separate storage device (not shown), or on any other type of volatile or non-volatile memory that stores instructions to cause a programmable processor to perform the techniques described herein. Alternatively or additionally, computing system 110 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processors may be used, as appropriate, along with multiple memories and/or types of memory.

Interface 126 may be implemented in hardware and/or software, and may be configured, for example, to receive the media content 102 from an appropriate media source (not shown). In some implementations, interface 126 may be configured to locate and/or request media content 102 from one or more media sources. For example, interface 126 may be configured to capture news feeds from different news channels or outlets on a recurring, scheduled, and/or ad hoc basis, and to provide the media content 102 for processing by the story recognition engine 112. Interface 126 may also be configured to output processed stories, e.g., stories 114a, 114b, and/or 114c for consumption by end users or other appropriate computing systems, such as a search engine or other appropriate system.

In some implementations, interface 126 may also include one or more user interfaces that allow a user (e.g., a system administrator) to interact directly with the computing system 110, e.g., to manually define or modify settings or options associated with the story recognition engine 112. Such settings or options may be stored in a database (not shown), and may be used by the story recognition engine 112 to adjust one or more processing parameters associated with story recognition functionality as described herein. Example user interfaces may include touchscreen devices, pointing devices, keyboards, voice input interfaces, visual input interfaces, or the like.

Segmentation module 128 may execute on one or more processors, e.g., processor 122, and may segment received media content 102 into a plurality of media segments based on auditory indicators included in the media content 102. For example, segmentation module 128 may analyze the audio portion of media content 102 to identify certain auditory tokens (e.g., silence of a given length, or particular types of auditory signals, such as music or specific tones) to identify logical breaks in the media content 102. In the example of a news program, segmentation based on silence or pauses in the audio portion of the media content 102 may lead to segments that align with sentences and/or paragraphs, as speakers may generally pause for a brief moment between sentences and/or paragraphs. Similarly, news programs may include musical jingles, a series of tones, or other auditory signals that indicate logical breaks between portions of the program. These and/or other appropriate auditory indicators may be used to allow segmentation module 128 to segment the media content 102.

In some implementations, segmentation module 128 may also or alternatively use visual indicators to segment the received media content 102. For example, segmentation module 128 may analyze the video portion of media content 102 to identify certain visual tokens (e.g., key frames that indicate substantial differences between successive frames of video, black frames, or other appropriate visual indicators) that may also or alternatively be used to identify logical breaks in the media content 102. When taken together, auditory indicators such as silence in combination with video indicators such as key frames may be used to accurately and consistently segment the media content 102 into appropriate media segments.

Segmentation module 128 may also use other appropriate indicators to cause or fine-tune the segmentation of media content 102 into a plurality of media segments. For example, speech-to-text processing of the audio portion of media content 102 may provide a transcript, which may be used, e.g., in association with the auditory and/or visual indicators as described above, to determine appropriate breaks for the segments (e.g., based on periods or other punctuation in the transcript). Similarly, closed-captioning information associated with the video portion of media content 102 may be used as an input to determine or confirm breaks for the segments.

After the media content 102 has been segmented, the respective media segments may be analyzed by content analysis module 130. Content analysis module 130 may execute on one or more processors, e.g., processor 122, and may analyze the media segments to determine a set of one or more key terms and/or concepts associated with the respective segments. In some implementations, analyzing a media segment may include generating a transcript of the audio portion of the media segment (e.g., using speech-to-text processing), and providing the transcript to a conceptual analysis engine, which in turn may provide the set of one or more concepts associated with the media segment. The conceptual analysis engine may also return key terms from the media segment, e.g., by removing any common terms or stop words that are unlikely to add any conceptual information about the particular segment. In some implementations, the content analysis module 130 may be configured to analyze the media segments natively (e.g., without converting the audio, video, or multimedia information to text) to determine the concepts associated with the media segments.

Segment merge module 132 may execute on one or more processors, e.g., processor 122, and may compare the concepts identified by content analysis module 130 to determine the conceptual similarity between one or more media segments, and may merge the media segments into a story if the conceptual similarity indicates that the media segments are sufficiently related. For example, in some implementations, the segment merge module 132 may compare a first set of concepts associated with a first media segment to a second set of concepts associated with a second media segment to determine a conceptual similarity between the first set of concepts and the second set of concepts. In some implementations, the conceptual similarity may be expressed as a numerical similarity score, or may otherwise be expressed as an objective conceptual similarity between the two segments.

Then, if the conceptual similarity exceeds a particular similarity threshold (e.g., that may be configured according to implementation-specific considerations), the segment merge module 132 may identify a story as including both of the media segments. In some implementations, the segment merge module 132 may be configured to analyze a certain number of nearby segments (e.g., the three preceding media segments) for conceptually similar segments. The number of nearby segments to be analyzed in such implementations may be configurable, e.g., by an administrator.

Conceptual similarity and the similarity threshold as described above may be defined in any appropriate manner to achieve the desired story identification results for a given implementation. For example, conceptual similarity may be determined based on matching concepts and/or key terms, or may be determined based on conceptual distances between concepts and/or key terms, or may be determined based on other appropriate techniques or combinations of techniques. In the case of matching concepts, the similarity threshold may be based on a percentage of the concepts and/or terms that match from one segment to another (e.g., 25% or greater, 50% or greater, etc.), or may be based on a number of matching or otherwise overlapping concepts (e.g., one or more, more than one, more than two, etc.). In the case of conceptual distances, the similarity threshold may be based on nearest conceptual distances, furthest conceptual distances, average conceptual distances, and/or other appropriate measures or combinations of measures. The similarity threshold may be configurable, e.g., by an administrator to achieve a desired level of consistency within the stories. For example, to generate more consistent stories, the similarity threshold may be increased.

In some implementations, segment merge module 132 may merge not only the segments that are determined to be conceptually similar as described above, but may also merge intervening media segments that are temporally situated between the segments that are to be merged into a story. Continuing the example above, if the first media segment and the second media segment are separated by three intervening media segments, the segment merge module 132 may merge the five media segments—bookended by the first and second media segments and including the three intervening media segments—into a single story even if the intervening media segments were not necessarily identified as being conceptually similar to either of the first or second media segments.

In some implementations, segment merge module 132 may exclude certain of the intervening media segments from being merged into the story if the particular intervening media segments are identified as being conceptually unrelated to the story. In the example above, if one of the three intervening media segments was identified as being unrelated (as opposed to simply not being identified as specifically related), the segment merge module 132 may merge four of the five media segments, again bookended by the first and second media segments, into a single story such that the story excludes the unrelated media segment. Such exclusion, for example, may ensure that advertisements or other completely separate media segments are not included as part of the story.

After the stories have been identified as described above, the story recognition engine 112 may perform post-identification processing on the stories. For example, the story recognition engine 112 may analyze any identified stories to generate summaries of the respective stories, or to divide the media content according to the stories, or to perform other appropriate processing. In such a manner, the stories from various media content may be made more accessible and/or consumable by users.

Figure 2:
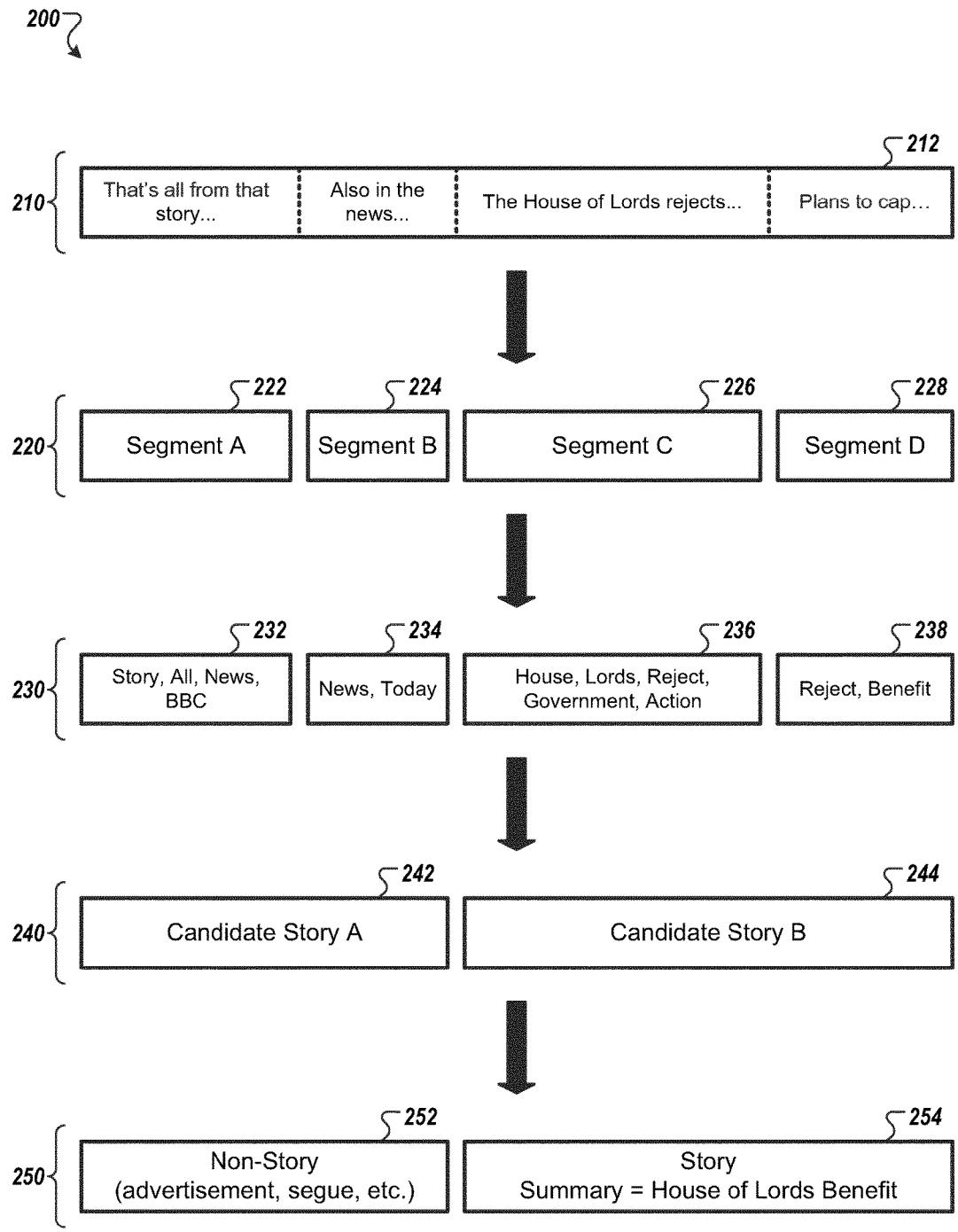
FIG. 2 is a conceptual diagram of an example process of identifying stories from media content in accordance with implementations described herein.

FIG. 2 is a conceptual diagram of an example process 200 of identifying stories from media content in accordance with implementations described herein. The process 200 may be performed, for example, by a story recognition processing system such as the story recognition engine 112 illustrated in FIG. 1. For clarity of presentation, the description that follows uses the story recognition engine 112 illustrated in FIG. 1 as the basis of an example for describing the process. However, it should be understood that another system, or combination of systems, may be used to perform the process or various portions of the process.

In stage 210, media content 212 is received by the story recognition engine 112. The media content 212 may generally be in the form of a single, continuous block of media, such as a thirty-minute news program with two advertisement breaks included during the program. The media content 212 shows dotted lines that are intended to represent the auditory and/or visual indicators as described above.

In stage 220, the media content 212 has been broken down into multiple media segments—Segment A 222, Segment B 224, Segment C 226, and Segment D 228. The story recognition engine 112 may use auditory and/or visual indicators included in the media content 212 to segment the content, e.g., according to sentences or other logical breaks in the content.

In stage 230, Segment A 222 has been analyzed to determine the set of concepts 232 associated with Segment A 222. Similarly, Segment B 224 has been analyzed to determine the set of concepts 234 associated with Segment B 224, and Segment C 226 has been analyzed to determine the set of concepts 236 associated with Segment C 226, and Segment D 228 has been analyzed to determine the set of concepts 238 associated with Segment A 228.

In stage 240, Segment A 222 and Segment B 224 have been merged into Candidate Story A 242, and Segment C 226 and Segment D 228 have been merged into Candidate Story B 244. Such merging may be based on a comparison of the concepts across segments, and a determination that the concepts 232 of Segment A 222 were conceptually similar to the concepts 234 of Segment B 224. Story recognition engine 112 may also have compared the concepts 236 of Segment C 226 and/or the concepts 238 of Segment D 228 to those in the previous segments and determined that there was insufficient conceptual similarity to merge the segments. Similarly, story recognition engine 112 may have merged Segment C 226 and Segment D 228 based on determining that the concepts 236 and 238 were conceptually similar enough that they were likely part of the same story.

In stage 250, Candidate Story A 242 has been identified as a non-story 252, and Candidate Story B 244 has been identified as a story 254. Non-stories, such as non-story 252, may be identified, e.g., in cases where the length of the story is less than a configurable minimum story length (e.g., less than thirty seconds), or in cases where the concepts are determined to be inconsequential (e.g., advertisements or non-story segues between stories), or under other appropriate circumstances. After a story has been identified as such, e.g., story 254, post-processing may also be performed. For example, in the case of story 254, the story has been summarized, e.g., based on the content of the story and/or the determined concepts associated with the story.

Figure 3:
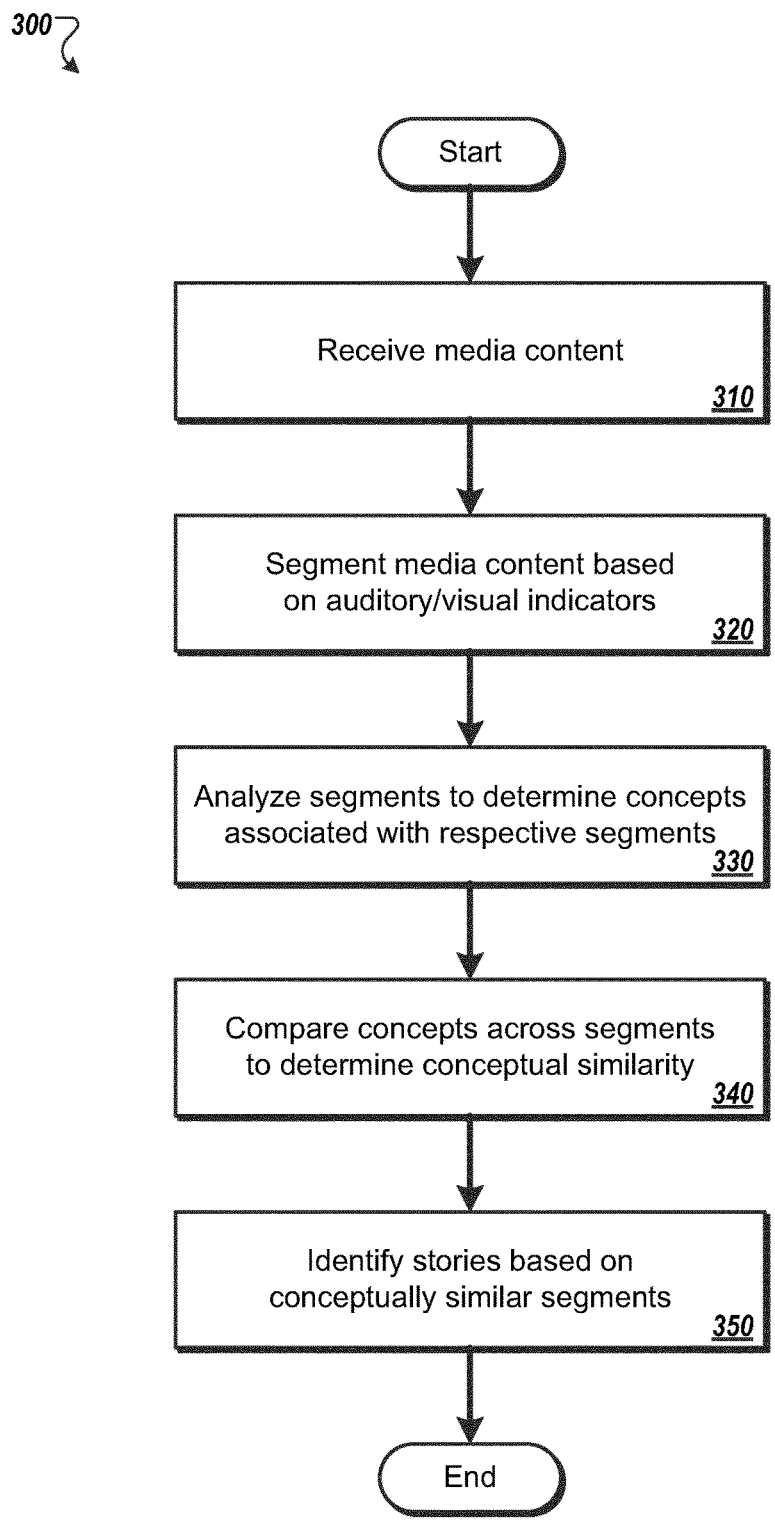
FIG. 3 is a flow diagram of an example process of identifying stories from media content in accordance with implementations described herein.

FIG. 3 is a flow diagram of an example process 300 of identifying stories from media content in accordance with implementations described herein. The process 300 may be performed, for example, by a story recognition processing system such as the story recognition engine 112 illustrated in FIG. 1. For clarity of presentation, the description that follows uses the story recognition engine 112 illustrated in FIG. 1 as the basis of an example for describing the process. However, it should be understood that another system, or combination of systems, may be used to perform the process or various portions of the process.

Process 300 begins at block 310 when media content is received. In some implementations, the media content may be provided directly to the story recognition engine 112 (e.g., by a user or a content provider). In other implementations, the story recognition engine 112 may actively locate and/or request media content for processing. For example, the story recognition engine 112 may actively monitor a particular news feed (e.g., streaming video content, or broadcast news channel) to gather appropriate media content for processing.

At block 320, the media content is segmented based on auditory indicators, visual indicators, or a combination of auditory and visual indicators. For example, the story recognition engine 112 may identify auditory tokens, video tokens, or other appropriate indicators of a logical break in the media content, and may segment the media content into media segments accordingly.

At block 330, the segments are analyzed to determine concepts associated with the respective segments. For example, the story recognition engine 112 may include a conceptual analysis engine or utilize a separate conceptual analysis engine to determine a set of one or more key terms and/or concepts associated with the respective segments. In some implementations, analyzing a media segment may include generating a transcript of the audio portion of the media segment (e.g., using speech-to-text processing), and providing the transcript to a conceptual analysis engine, which in turn may provide the set of one or more concepts associated with the media segment. The conceptual analysis engine may also return key terms from the media segment. In some implementations, conceptual analysis engine may be configured to analyze the media segments natively (e.g., without converting the audio, video, or multimedia information to text).

At block 340, the determined concepts are compared across segments to determine conceptual similarity of the segments. For example, the story recognition engine 112 may compare a first set of concepts associated with a first media segment to a second set of concepts associated with a second media segment to determine a conceptual similarity between the first set of concepts and the second set of concepts.

At block 350, stories are identified based on the conceptually similar segments. For example, the story recognition engine 112 may identify a story made up of two media segments if it determines that the two media segments are conceptually similar. In some implementations, the story recognition engine 112 may merge multiple conceptually similar media segments into a story, e.g., if the comparison of block 340 indicates that the media segments are sufficiently related.

Figure 4:
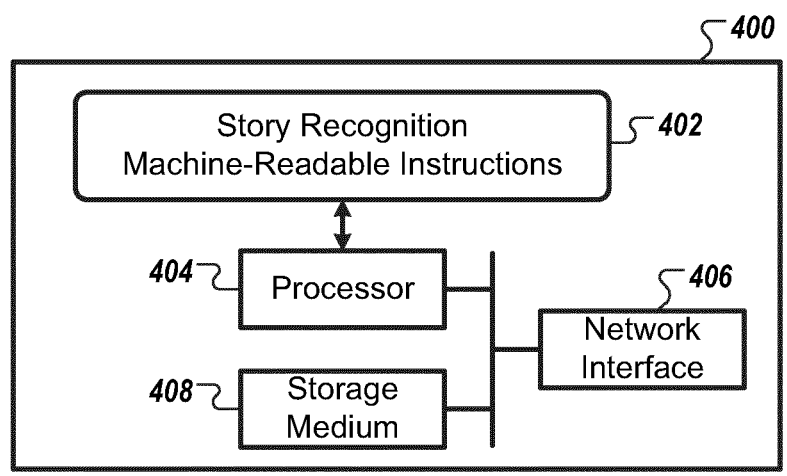
FIG. 4 is a block diagram of an example computer system to identify stories from media content in accordance with implementations described herein.

FIG. 4 is a block diagram of an example computer system 400 to identify stories from media content in accordance with implementations described herein. The system 400 includes story recognition machine-readable instructions 402, which may include or be implemented by certain of the various modules depicted in FIG. 1. The story recognition machine-readable instructions 402 may be loaded for execution on a processor or processors 404. As used herein, a processor may include a microprocessor, microcontroller, processor module or subsystem, programmable integrated circuit, programmable gate array, or another control or computing device. The processor(s) 404 may be coupled to a network interface 406 (to allow the system 400 to perform communications over a data network) and/or to a storage medium (or storage media) 408.

The storage medium 408 may be implemented as one or multiple computer-readable or machine-readable storage media. The storage media may include different forms of memory including semiconductor memory devices such as dynamic or static random access memories (DRAMs or SRAMs), erasable and programmable read-only memories (EPROMs), electrically erasable and programmable read-only memories (EEPROMs), and flash memories; magnetic disks such as fixed, floppy and removable disks; other magnetic media including tape; optical media such as compact disks (CDs) or digital video disks (DVDs); or other appropriate types of storage devices.

Note that the instructions discussed above may be provided on one computer-readable or machine-readable storage medium, or alternatively, may be provided on multiple computer-readable or machine-readable storage media distributed in a system having plural nodes. Such computer-readable or machine-readable storage medium or media is (are) considered to be part of an article (or article of manufacture). An article or article of manufacture may refer to any appropriate manufactured component or multiple components. The storage medium or media may be located either in the machine running the machine-readable instructions, or located at a remote site, e.g., from which the machine-readable instructions may be downloaded over a network for execution.

Although a few implementations have been described in detail above, other modifications are possible. For example, the logic flows depicted in the figures may not require the particular order shown, or sequential order, to achieve desirable results. In addition, other steps may be provided, or steps may be eliminated, from the described flows. Similarly, other components may be added to, or removed from, the described systems. Accordingly, other implementations are within the scope of the following claims.

What is claimed is:

1. A computer-implemented method of identifying stories in media content, the method comprising:
receiving, at a computing system, media content;
segmenting, using the computing system, the media content into a plurality of media segments based on auditory indicators included in the media content;
analyzing, using the computing system, a first media segment from among the plurality of media segments to determine a first set of concepts associated with the first media segment;
analyzing, using the computing system, a second media segment from among the plurality of media segments to determine a second set of concepts associated with the second media segment;
comparing, using the computing system, the first set of concepts to the second set of concepts to determine a first conceptual similarity between the first set of concepts and the second set of concepts; and
in response to the first conceptual similarity exceeding a similarity threshold, identifying a story that includes the first media segment and the second media segment, wherein identifying comprises:
analyzing an intervening media segment between the first media segment and the second media segment to determine a third set of concepts associated with the intervening media segment;
determining that both a second conceptual similarity between the third set of concepts associated with the intervening media segment and the first set of concepts and a third conceptual similarity between the third set of concepts and the second set of concepts do not exceed the similarity threshold; and
merging the first media segment, the second media segment, and the intervening media segment even though the second and third conceptual similarities do not exceed the similarity threshold.

2. The computer-implemented method of claim 1, wherein segmenting the media content is further based on visual indicators included in the media content.

3. The computer-implemented method of claim 1, wherein the conceptual similarity is determined based on matching concepts included in the first set to concepts included in the second set.

4. The computer-implemented method of claim 1, wherein the conceptual similarity is determined based on conceptual distances between concepts included in the first set and concepts included in the second set.

5. The computer-implemented method of claim 1, wherein the media content comprises a multimedia content stream.

6. The method of claim 1, further comprising identifying the story that includes the first media segment, the second media segment, and the intervening media segment as a non-story responsive to determining the duration of the story is less than a minimum time threshold.

7. The method of claim 1, further comprising identifying the story that includes the first media segment, the second media segment, and the intervening media segment as a non-story responsive to determining the story includes advertisement or non-story segue concepts.

8. A story recognition system comprising:
one or more processors; and
a non-transitory computer-readable medium storing instructions that, when executed by the one or more processors, cause the story recognition system to:
segment media content into a plurality of media segments based on auditory indicators included in the media content;
analyze the media segments to determine concepts associated with the respective media segments;
compare the concepts associated with a first media segment to the concepts associated with a second media segment to determine a first conceptual similarity between the first media segment and the second media segment;
obtain a story that includes the first media segment and the second media segment in response to a determination that the first conceptual similarity exceeds a similarity threshold, wherein obtaining the story comprises:
analyzing an intervening media segment between the first media segment and the second media segment to determine a third set of concepts associated with the intervening media segment;
determining that both a second conceptual similarity between the third set of concepts associated with the intervening media segment and the first set of concepts and a third conceptual similarity between the third set of concepts and the second set of concepts do not exceed the similarity threshold; and
merging the first media segment, the second media segment, and the intervening media segment into the story even though the second and third conceptual similarities do not exceed the similarity threshold.

9. The story recognition system of claim 8, wherein the instructions, when executed by the one or more processors, cause the story recognition engine to segment the media content further based on visual indicators included in the media content.

10. The story recognition system of claim 8, wherein the conceptual similarity is determined based on matching the concepts associated with the first media segment to the concepts associated with the second media segment.

11. The story recognition system of claim 8, wherein the conceptual similarity is determined based on conceptual distances between the concepts associated with the first media segment and the concepts associated with the second media segment.

12. The story recognition system of claim 8, wherein the media content comprises a multimedia content stream.

13. The story recognition system of claim 8, wherein the non-transitory machine-readable medium further stores instructions that, when executed by the one or more processors, cause the story recognition system to:
identify the story that includes the first media segment, the second media segment, and the intervening media segment as a non-story responsive to determining the duration of the story is less than a minimum time threshold.

14. The story recognition system of claim 8, wherein the non-transitory machine-readable medium further stores instructions that, when executed by the one or more processors, cause the story recognition system to:
identify the story that includes the first media segment, the second media segment, and the intervening media segment as a non-story responsive to determining the story includes advertisement or non-story segue concepts.

15. A non-transitory computer-readable storage medium storing instructions that, when executed by one or more processors, cause the one or more processors to:
segment media content into a plurality of media segments based on auditory indicators included in the media content;
analyze the media segments to determine concepts associated with the respective media segments;
compare the concepts associated with a first media segment to the concepts associated with a second media segment to determine a first conceptual similarity between the first media segment and the second media segment;
obtain a story that includes the first media segment and the second media segment in response to a determination that the first conceptual similarity exceeds a similarity threshold, wherein obtaining the story comprises:
analyzing an intervening media segment between the first media segment and the second media segment to determine a third set of concepts associated with the intervening media segment;
determining that both a second conceptual similarity between the third set of concepts associated with the intervening media segment and the first set of concepts and a third conceptual similarity between the third set of concepts and the second set of concepts do not exceed the similarity threshold; and
merging the first media segment, the second media segment, and the intervening media segment into the story even though the second and third conceptual similarities do not exceed the similarity threshold.

* * * * *